United States Patent [19]
Vorbach et al.

[11] Patent Number: 6,021,490
[45] Date of Patent: Feb. 1, 2000

[54] RUN-TIME RECONFIGURATION METHOD FOR PROGRAMMABLE UNITS

[75] Inventors: Martin Vorbach; Robert Münch, both of Karlsruhe, Germany

[73] Assignee: PACT GMBH, Karlsruhe, Germany

[21] Appl. No.: 08/946,998

[22] Filed: Oct. 8, 1997

[30] Foreign Application Priority Data

Dec. 20, 1996 [DE] Germany .......................... 196 54 593

[51] Int. Cl.⁷ .................................................. G06F 7/38
[52] U.S. Cl. ............................................. 713/100; 326/39
[58] Field of Search .................. 713/100; 708/230–236; 326/37–40; 710/131

[56] References Cited

U.S. PATENT DOCUMENTS

| | | |
|---|---|---|
| Re. 34,363 | 8/1993 | Freeman . |
| 4,706,216 | 11/1987 | Carter . |
| 4,739,474 | 4/1988 | Holszlynski et al. . |

(List continued on next page.)

FOREIGN PATENT DOCUMENTS

| | | |
|---|---|---|
| 0 221 360 | 5/1987 | European Pat. Off. . |
| 0428327A1 | 5/1991 | European Pat. Off. . |
| 748 051 A2 | 12/1991 | European Pat. Off. . |
| 0539595A1 | 5/1993 | European Pat. Off. . |
| 0 678 985 | 10/1995 | European Pat. Off. . |
| 0 726 532 | 8/1996 | European Pat. Off. . |
| 735 685 | 10/1996 | European Pat. Off. . |
| WO90/11648 | 10/1990 | WIPO . |
| 94/08399 | 4/1994 | WIPO . |

OTHER PUBLICATIONS

Villasenor, John et al., "Configurable Computing."*Scientific American*, vol. 276, No. 6, Jun. 1997, pp. 66–71.

Villasenor, John et al., "Configurable Computing Solutions for Automatic Target Recognition," *IEEE*, 1996 pp. 70–79.

Tau, Edward, et al., "A First Generation DPGA Implementation," *FPD'95*, pp. 138–143.

Athanas, Peter, et al., "IEEE Symposium on FPGAs For Custom Computing Machines," *IEEE Computer Society Press*, Apr. 19–21, 1995, pp. i–vii, 1–222.

Bittner, Ray, A., Jr., "Wormhole Run–Time Reconfiguration: Conceptualization and VLSI Design of a High Performance Computing system," *Dissertation*, Jan. 23, 1997, pp. i–xx, 1–415.

Myers G., Advances in Computer Architecture, Wiley–Interscience Publication, 2nd ed., John Wiley & Sons, Inc. pp. 463–494, 1978.

M. Saleeba, "A Self–Contained Dynamically Reconfigurable Processor Architecture", Sixteenth Australian Computer Science Conference, ASCS–16, QLD, Australia, Feb. 1993.

M. Morris Mano, "Digital Design,"by Prentice Hall, Inc., Englewood Cliffs, New Jersey 07632, 1984, pp. 119–125, 154–161.

Maxfield, C. "Logic that Mutates While–U–Wait" EDN (Bur. Ed) (USA), EDN (European Edition), Nov. 7, 1996, Cabners Publishing, USA.

*Primary Examiner*—Thomas M. Heckler
*Attorney, Agent, or Firm*—Kenyon & Kenyon

[57] ABSTRACT

A method of run-time reconfiguration of a programmable unit is provided, the programmable unit including a plurality of reconfigurable function cells in a multidimensional arrangement. An event is detected. The source of the detected event is determined, and an address of an entry in a jump table is calculated as a function of the source of the event, the entry storing a memory address of a configuration for a reconfigurable function cell. The entry is retrieved and a state of a corresponding reconfigurable cell is determined. If the reconfigurable cell is in a reconfiguration state, the reconfigurable cell is reconfigured as a function of the configuration data. If the reconfigurable cell is not in a reconfiguration state, the configuration data is stored in a FIFO.

15 Claims, 6 Drawing Sheets

U.S. PATENT DOCUMENTS

| | | |
|---|---|---|
| 4,761,755 | 8/1988 | Ardini et al. . |
| 4,811,214 | 3/1989 | Nosenchuck et al. . |
| 4,870,302 | 9/1989 | Freeman . |
| 4,901,268 | 2/1990 | Judd . |
| 4,967,340 | 10/1990 | Dawes . |
| 5,014,193 | 5/1991 | Garner et al. . |
| 5,015,884 | 5/1991 | Agrawal et al. . |
| 5,021,947 | 6/1991 | Campbell et al. . |
| 5,023,775 | 6/1991 | Porer . |
| 5,081,375 | 1/1992 | Pickett et al. . |
| 5,109,503 | 4/1992 | Cruickshank et al. . |
| 5,123,109 | 6/1992 | Hillis . |
| 5,125,801 | 6/1992 | Nabity et al. . |
| 5,128,559 | 7/1992 | Steele . |
| 5,142,469 | 8/1992 | Weisenborn . |
| 5,204,935 | 4/1993 | Mihara et al. . |
| 5,208,491 | 5/1993 | Ebeling et al. . |
| 5,226,122 | 7/1993 | Thayer et al. . |
| 5,233,539 | 8/1993 | Agrawal et al. . |
| 5,247,689 | 9/1993 | Ewert . |
| 5,287,472 | 2/1994 | Horst . |
| 5,301,344 | 4/1994 | Kolchinsky . |
| 5,303,172 | 4/1994 | Magar et al. . |
| 5,336,950 | 8/1994 | Popli et al. . |
| 5,361,373 | 11/1994 | Gilson . |
| 5,418,952 | 5/1995 | Morley et al. . |
| 5,421,019 | 5/1995 | Holszlynski et al. . |
| 5,422,823 | 6/1995 | Agrawal et al. . |
| 5,426,378 | 6/1995 | Ong . |
| 5,430,687 | 7/1995 | Hung et al. . |
| 5,440,245 | 8/1995 | Galbraith et al. . |
| 5,442,790 | 8/1995 | Nosenchuck . |
| 5,444,394 | 8/1995 | Watson et al. . |
| 5,448,186 | 9/1995 | Kawata . |
| 5,455,525 | 10/1995 | Ho et al. . |
| 5,457,644 | 10/1995 | McCollum . |
| 5,473,266 | 12/1995 | Ahanin et al. . |
| 5,473,267 | 12/1995 | Stansfield . |
| 5,475,583 | 12/1995 | Bock et al. . |
| 5,475,803 | 12/1995 | Stearns et al. . |
| 5,483,620 | 1/1996 | Pechanek et al. . |
| 5,484,103 | 1/1996 | Pedersen et al. . |
| 5,485,104 | 1/1996 | Agrawal et al. . |
| 5,489,857 | 2/1996 | Agrawal et al. . |
| 5,491,353 | 2/1996 | Kean . |
| 5,493,239 | 2/1996 | Zlotnick . |
| 5,497,498 | 3/1996 | Taylor . |
| 5,506,998 | 4/1996 | Kato et al. . |
| 5,510,730 | 4/1996 | El Garnal et al. . |
| 5,511,173 | 4/1996 | Yamaura et al. . |
| 5,513,366 | 4/1996 | Agarwal et al. . |
| 5,521,837 | 5/1996 | Frankle et al. . |
| 5,522,083 | 5/1996 | Gove et al. . |
| 5,532,693 | 7/1996 | Winters et al. . |
| 5,532,957 | 7/1996 | Malhi . |
| 5,535,406 | 7/1996 | Kolchinsky . |
| 5,537,057 | 7/1996 | Leong et al. . |
| 5,537,601 | 7/1996 | Kimura et al. . |
| 5,541,530 | 7/1996 | Cliff et al. . |
| 5,544,336 | 8/1996 | Kato et al. . |
| 5,548,773 | 8/1996 | Kemney et al. . |
| 5,555,434 | 9/1996 | Carlstedt . |
| 5,559,450 | 9/1996 | Ngai et al. . |
| 5,561,738 | 10/1996 | Kinerk et al. . |
| 5,570,040 | 10/1996 | Lytle et al. . |
| 5,583,450 | 12/1996 | Trimberger et al. . |
| 5,586,044 | 12/1996 | Agrawal et al. . |
| 5,587,921 | 12/1996 | Agrawal et al. . |
| 5,588,152 | 12/1996 | Dapp et al. . |
| 5,590,345 | 12/1996 | Barker et al. . |
| 5,742,180 | 4/1998 | DeHon et al. .............................. 326/40 |
| 5,828,858 | 10/1998 | Athanas et al. ......................... 710/131 |

RUN-TIME RECONFIGURATION METHOD FOR PROGRAMMABLE UNITS

FIELD OF THE INVENTION

The present invention relates to reprogrammable units.

BACKGROUND INFORMATION

Programmable units with a two- or multi-dimensional cell architecture (in particular FPGAs (field programmable gate arrays), DPGAs (dynamically programmable gate arrays) and DFPs (data flow processors, etc.) are programmed today in two different ways.

Once, i.e., the configuration cannot be changed after programming. All the configured elements of the unit thus perform the same function over the entire period of time during which the application is being carried out.

During operation, i.e., the configuration can be changed after installation of the unit, by loading a configuration data file, at the start of the application. Units such as, for example, FPGA units, cannot be reconfigured during operation. With reconfigurable units, further processing of data during the reconfiguration is usually impossible, and the required reconfiguration time is much too long.

In addition to FPGAs, there are also DPGAs. These units store a number of different configurations which are selected by a special data packet. Run-time reconfiguration of these memory devices is impossible.

Major problems are posed by run-time reconfiguration of all programmable units or parts thereof, especially synchronization. All the possibilities proposed so far involve stopping the processing of the entire unit during reconfiguration. Another problem is selection of the new subconfiguration to be loaded and integration of this subconfiguration into the existing configuration.

SUMMARY OF THE INVENTION

The method according to the present invention makes it possible to reload a run-time reconfigurable unit efficiently and without having any effect on the areas not involved in the reconfiguration. In addition, this method makes it possible to select configurations as a function of the prevailing configuration. The problem of synchronizing the areas involved in the reconfiguration with those not involved in the reconfiguration is also solved.

In accordance with an exemplary embodiment of the present invention, a method is provided for reconfiguring programmable units having a two- or multi-dimensional cell arrangement. The method of the present invention makes it possible to reconfigure the unit(s) without limiting the operability of the cells not involved in the reconfiguration. This method makes it possible to load complete configurations or subconfigurations into the programmable unit(s).

DETAILED DESCRIPTION OF THE INVENTION

The method in accordance with the exemplary embodiment that is described herein presupposes a programmable unit which has the following properties:

Primary logic unit: The primary logic unit (PLU) is the part of the unit that performs the loading and entering of configuration strings into the elements of the unit to be configured (cells).

Cells: The unit has a number of cells that can be addressed individually by the PLU.

Feedback to the PLU: Each cell or group of cells must be able to notify the PLU whether it can be reconfigured.

Feedback to cells: Each cell must have the option of sending a STOP signal to the cells from which it has received its data to be processed.

START/STOP identifier: Each cell must have the possibility of setting a START/STOP identifier.

The START identifier characterizes a cell as the start of a longer processing chain (macro).

The STOP identifier marks the end of the macro, i.e., the point at which the processing of the macro has yielded a result.

Structure of a configuration string: The PLU in accordance with the exemplary embodiment of the present invention is a state machine that can process configuration strings.

In addition to configuration strings for cells, there are entries which can be recognized as commands by the PLU. It is thus possible to differentiate whether the contents of the configuration string are to be transmitted to a cell or whether they represent a command for the state machine.

A configuration string which is transmitted to cells of the unit must contain at least the following data:

Address of the cell, e.g., as linear numbers or as X, Y coordinates.

Configuration string which is transmitted to the cell.

Identifiers and commands for the PLU: For correct operation of the PLU, it must be able to recognize only two command strings, namely:

END

Figure 2:
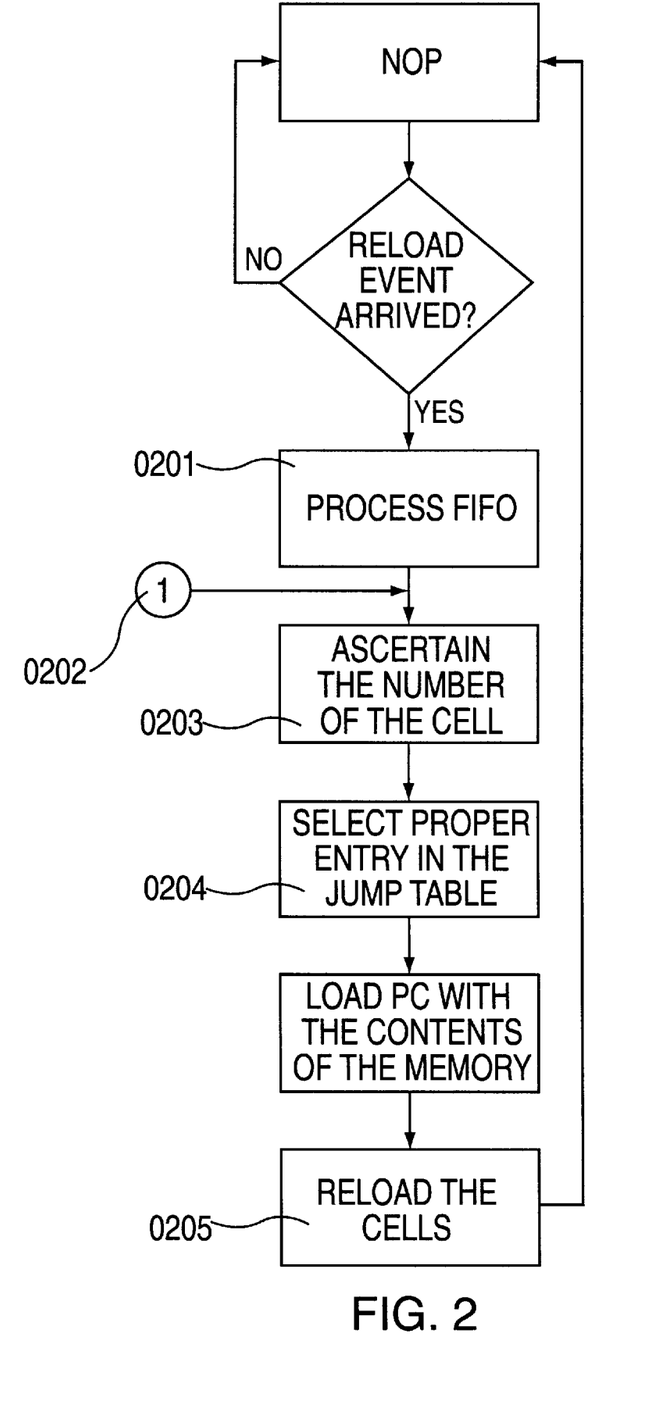
FIG. 2 shows a flow chart of the steps to be carried out after a reconfiguration request is received in accordance with the exemplary embodiment of the present invention.

This is a command that sets the PLU in a state in which it waits for the arrival of events from cells (FIG. 2).

DISPATCH (entry number, address)

The PLU enters the value of the address parameter into the address, which is given by the entry number parameter, of the jump table.

In addition, the PLU can recognize an entry as a blank entry. This is accomplished by defining a certain bit pattern as a blank identifier which can be recognized by the PLU.

Figure 5:
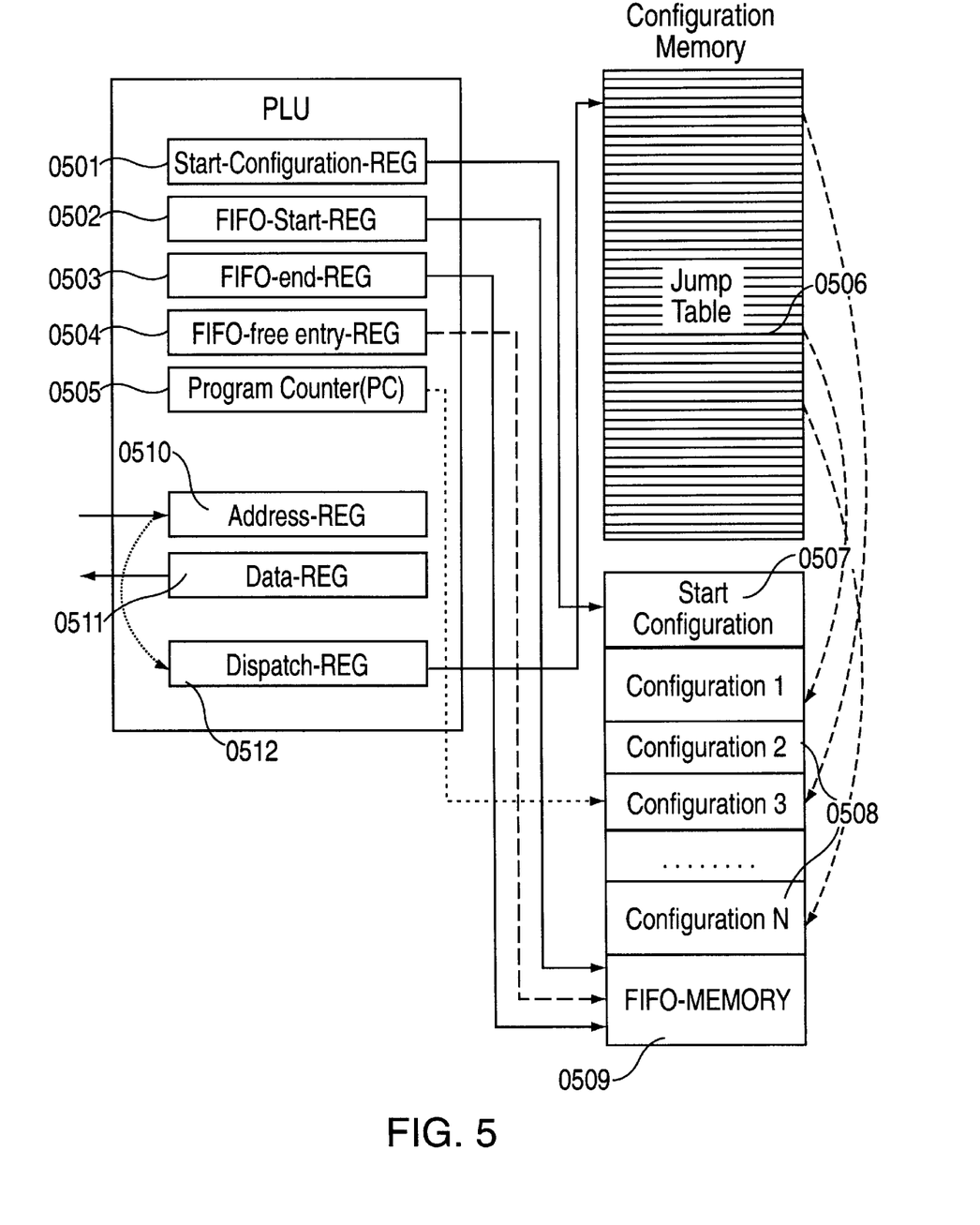
FIG. 5 shows the PLU with its registers, as well as the configuration memory, the subdivision into jump table, start configuration, additional configurations and the FIFO memories, in accordance with the exemplary embodiment of the present invention.
Figure 6:
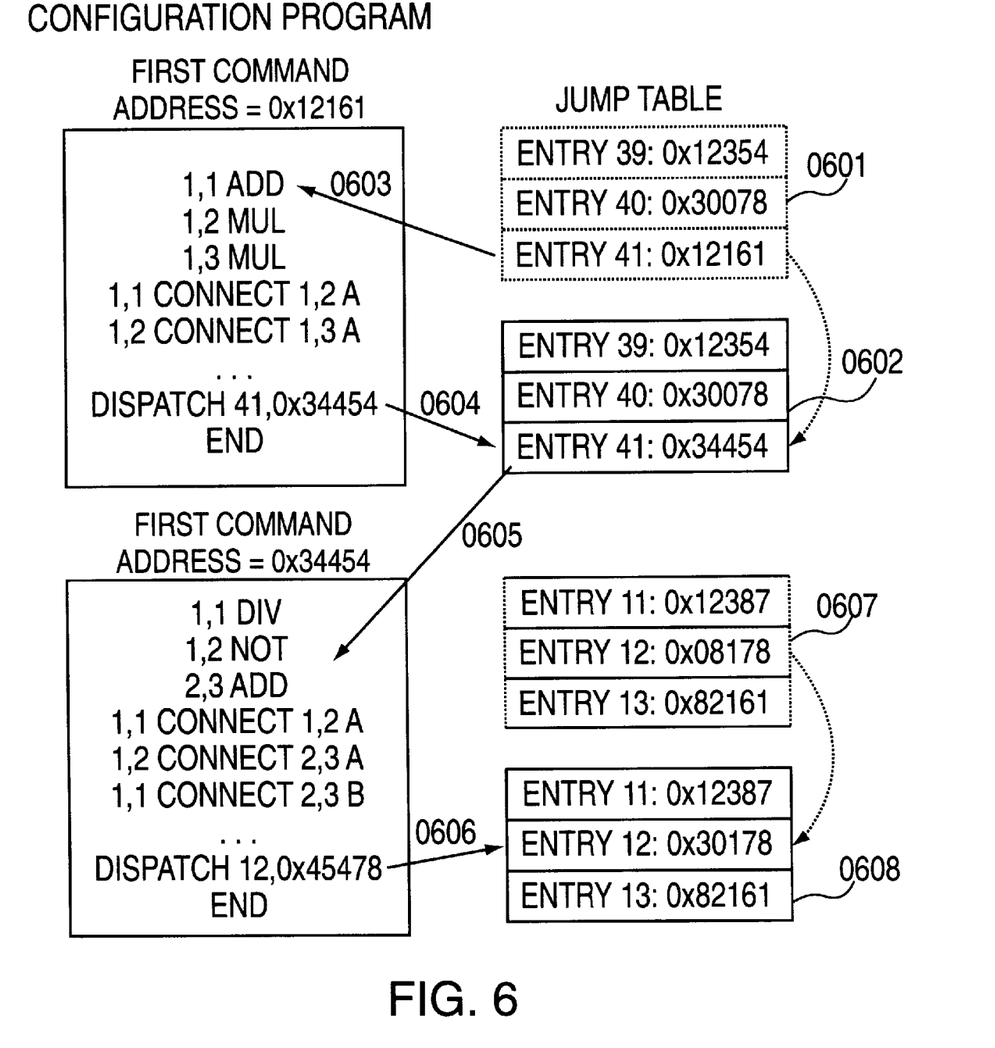
FIG. 6 shows two details from a configuration program and four details from the jump table and how they are related in time in accordance with the exemplary embodiment of the present invention.

The jump table: There is a jump table (0506) in the configuration memory. The size of the jump table is selected, for example, so that there is exactly one single entry for each cell that can be addressed by the PLU. For each cell address there is exactly one single entry in the jump table which can be calculated by the PLU (FIGS. 5 and 6).

There is a memory address (0601) in an entry in the jump table. This memory address indicates where additional configuration data (0508) from the configuration memory are to be read if there is a feedback from this cell to the PLU.

Figure 1:
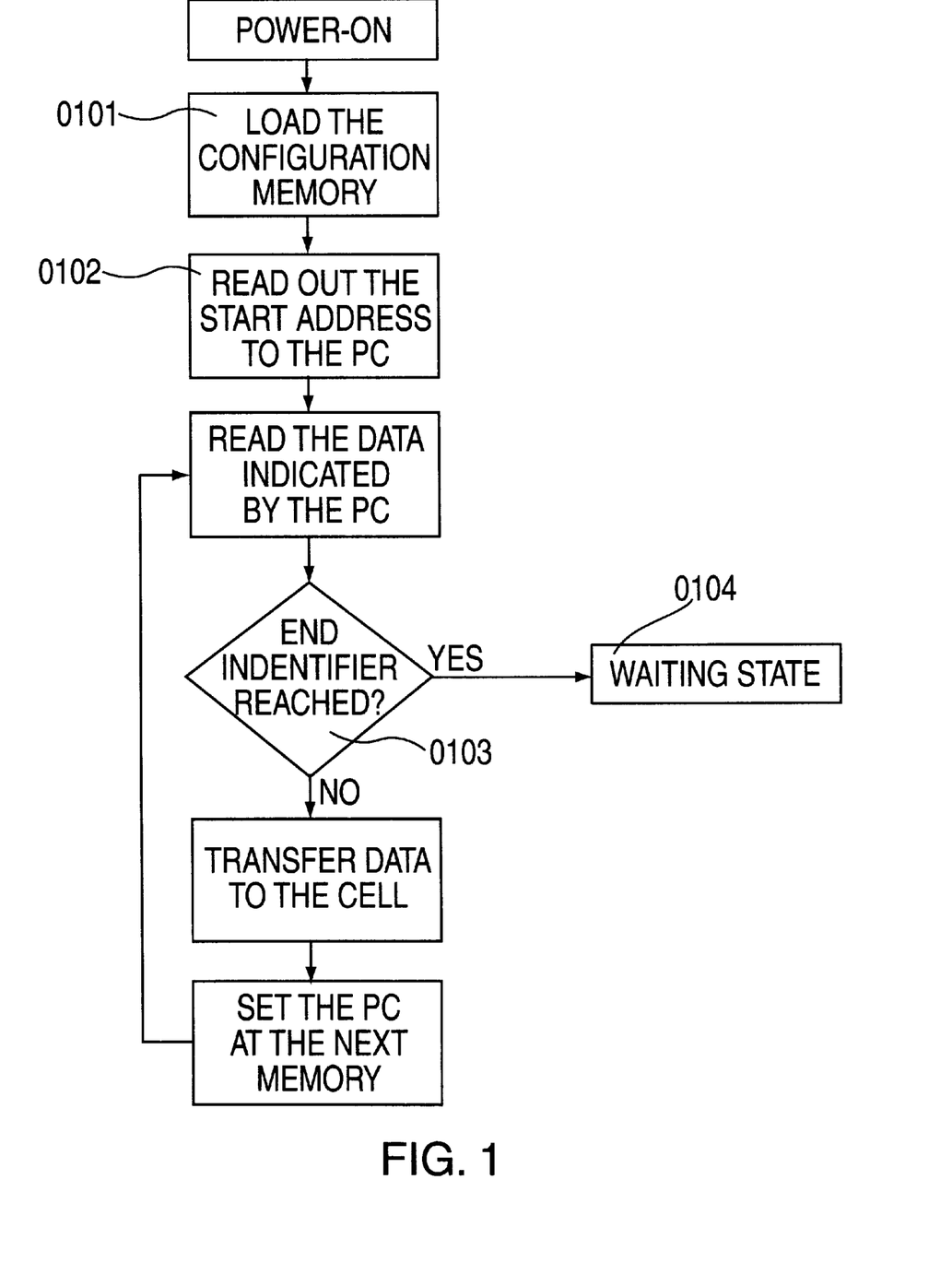
FIG. 1 shows a flow chart of the steps to be carried out after a system start in accordance with an exemplary embodiment of the present invention.

Start of the system: By resetting the system, the PLU begins to receive or load configuration data from a memory into the configuration memory (0101). All the cells of the unit are in the state in which they can be configured. Then, by loading the program counter (PC) (0505), the PLU jumps to a memory site containing (0102) the address of a start configuration (0507). This start configuration is processed until the PLU recognizes an END identifier (0103). This start configuration programs the unit in such a way that processing of data can begin. After entering the start configuration, the PLU changes on the basis of the END identifier to a state in which it waits for results from the cells (0104).

Arrival of an event from a cell: After processing data, a cell can send a feedback to the PLU. This feedback (event) indicates that the cell and thus the macro in which the cell is contained has completed its work and reloading can begin.

However, before beginning with the loading of a new configuration, the FIFO memory (first-in-first-out memory) described below is processed (0201).

It is advantageous for the memory to be organized as a FIFO memory. This organization guarantees, for example, that cells which could not be reloaded in the first attempt are guaranteed to be the first in line in the second attempt. This prevents cells which have signaled in the meantime that they can be reconfigured from slipping to the back in processing. In this case, a deadlock situation could occur in which one macro can be reconfigured only when another macro has been reconfigured.

Through the feedback to the PLU, the PLU also receives the address or the number of the cell that triggered the feedback. With this number, the proper entry in the jump table is selected (0203, 0204). The address contained in this entry indicates the start of the configuration to be loaded within the configuration memory (0205).

FIFO memory: The method in accordance with the exemplary embodiment of the present invention takes into account the fact that some cells might not have completed their work, although these cells should already be reloaded. All configuration data of cells in which such a condition applies are copied to a special memory area (FIFO memory) (0506).

Each time before a new configuration is to be loaded, the FIFO memory is run through. Since a new configuration is to be loaded, some cells have completed their work and have entered the "reconfigurable" state. These cells may also include those in which reconfiguration by the PLU has failed in a previous attempt because these cells had not yet completed their work but now this reconfiguration can be performed successfully.

Figure 3:
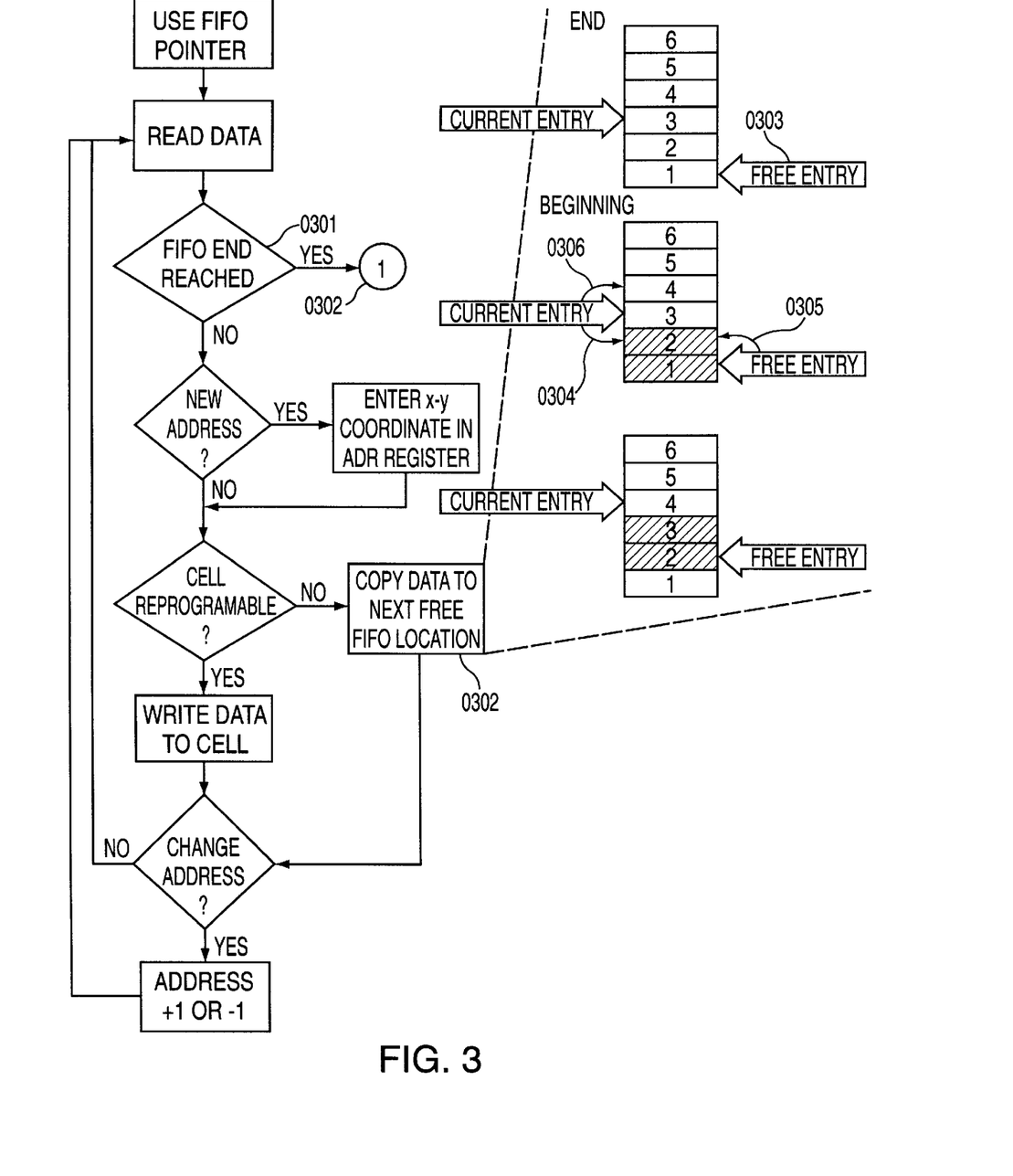
FIG. 3 shows a flow chart of the steps to be carried out in the FIFO memory processing in accordance with the exemplary embodiment of the present invention.

This PLU loads the PC with the contents of the register which indicates the start of FIFO memory (FIFO start REG) (0502) and reads data out of the FIFO memory. A comparison ascertains whether the end of the FIFO memory has been reached (0301). If this is the case, the system returns to the point in the state machine where reconfiguration is continued (0202).

The FIFO memory is processed like a configuration within the configuration memory. The case can occur where a cell cannot be reconfigured even with another attempt. In this case the configuration data is copied (0302) to this memory location if there is an empty memory location closer to the front of FIFO memory.

This copying operation is accomplished by virtue of the fact that the PLU has stored the start address of the FIFO memory in FIFO start REG (0502) and the end address in FIFO end REG (0503). In addition, the PLU identifies the address of the next free entry (starting from the beginning of the FIFO memory) by means of FIFO free entry REG (0504, 0303). After the configuration string has been copied (0304) to the free entry, the PLU positions the pointer of FIFO free entry REG at the next free entry (0305) within the FIFO memory. The search is then conducted in the direction of the end of the FIFO memory. Then the PC is set at the next entry within the FIFO memory (0306).

Figure 4:
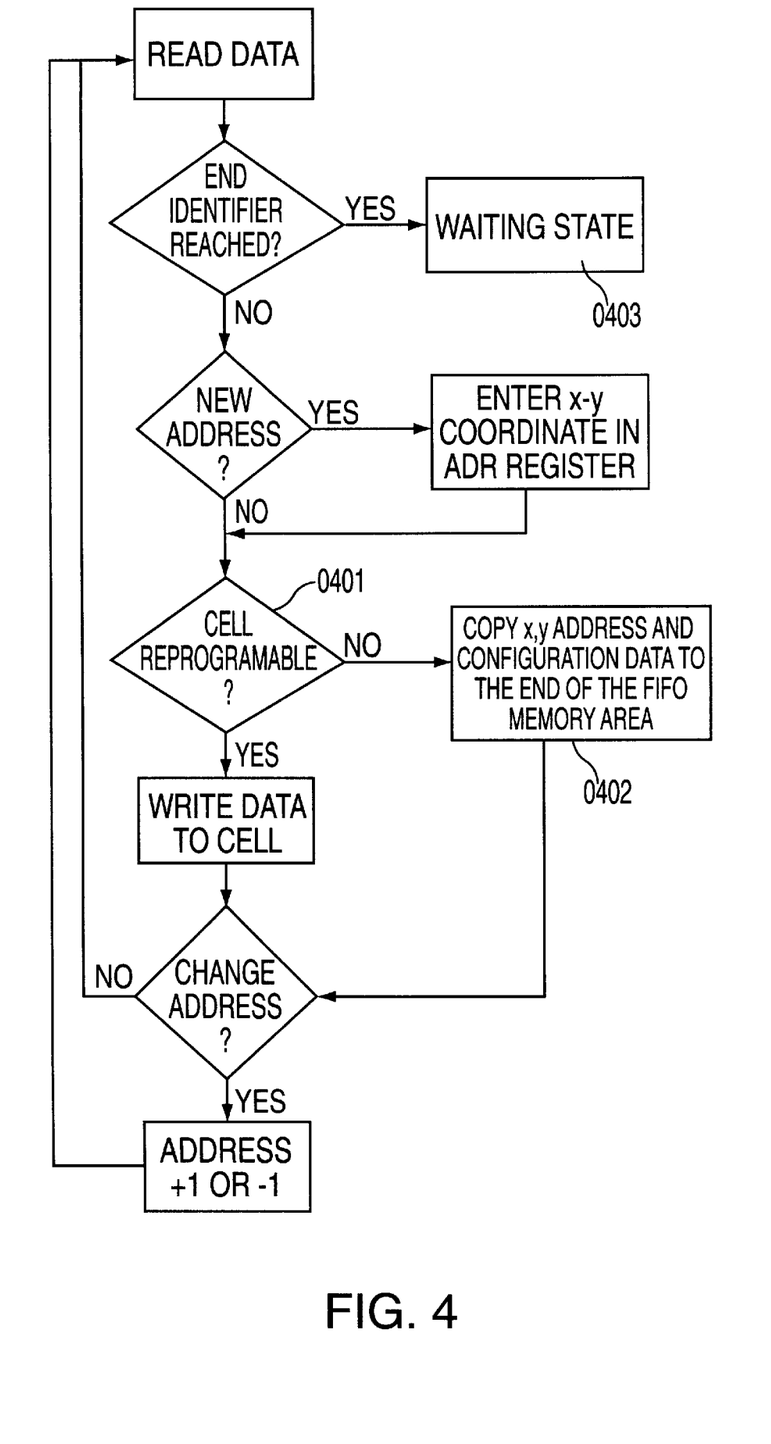
FIG. 4 shows a flow chart of the steps to be carried out in configuring the cells in accordance with the exemplary embodiment of the present invention.

Reloading cells: The PLU then reads the configuration data out of the configuration memory. This data contains the address of the cell to be reloaded (FIG. 4). Each cell can signal that it can be reloaded. The PLU tests this (0401). If the cell can be reloaded, the configuration data is transferred from the PLU to the cell.

If the cell is not yet ready, the data read by the PLU are written to a memory area, the FIFO memory, within the configuration memory (0402). The address to which the data is written is stored in a register (FIFO end REG) (0503) in the PLU.

This process is repeated until the PLU recognizes the END identifier of the configuration program and returns it to the state in which the PLU waits for events from the cells (0403).

Structure of the configuration program: After a cell has given the signal for reloading and the macro in which the cell is integrated has been reloaded, a new configuration is obtained. The cell which has previously given the signal to the PLU can now have a very different function, in particular it may no longer be the cell which sends a reload signal to the PLU. In the new configuration, it is possible for the same cell to again send the reload signal to the PLU.

By means of the DISPATCH command within the configuration program, a new address can be written to the entry position of the cell in the jump table (0604). This new address may point to a new configuration or subconfiguration to be loaded upon feedback from this cell.

FIG. 1 shows a flow chart of the steps to be carried out after a system start. The system goes to the waiting state (0104) upon comparison of the start configuration with the END identifier.

FIG. 2 shows a flow chart of the required steps to be carried out during the waiting state and after a reconfiguration has been signaled by a cell. The flow chart has an entry point (0202) which is accessed from another location.

FIG. 3 shows a flow chart of how the FIFO memory is to be handled. It also shows how the copy process works within the FIFO memory.

FIG. 4 shows in a flow chart which steps are necessary in reconfigurating the cells and how a configuration is processed within the configuration program.

FIG. 5 shows the PLU and its registers. The PLU has five different registers, namely:

The start configuration REG (0501). This register contains the address of the start configuration within the configuration memory. The data is contained in the configuration program in such a way that it can be recognized by the PLU and transferred to the start configuration REG.

A FIFO start REG (0502). The FIFO start REG indicates the start of the FIFO memory area within the configuration memory.

A FIFO end REG (0503). The FIFO end REG denotes the end of the FIFO memory. The configuration strings which could not be processed by the PLU are copied to this location.

A FIFO free entry REG (0504). The FIFO free entry REG indicates the free entry closest to the beginning (FIFO start REG) of the FIFO memory. The configuration strings which again could not be processed by the PLU during the run-through of The FIFO memory are copied to this location.

A program counter (PC). The PC points to the address within the configuration memory where the next configuration string to be processed by the PLU is located.

An address REG (0510). The address of a cell to be addressed is stored in this register.

A data REG (0511). This register stores the configuration data to be sent to the cell addressed by address REG.

A dispatch REG (0512). Dispatch REG stores the address of the entry in the jump table accessed by the PLU.

In addition, the configuration memory and its various sections are also shown. These are:

The jump table (0506). For each cell that can be configured by the PLU there is a single entry. This entry contains the address which is loaded into the PC when signaled by this cell.

A start configuration (0507). The start configuration is any configuration loaded into the unit after starting the system.

Additional configurations (0508). These configurations can be loaded into the unit during system run time. The configurations consist of configuration strings and PLU commands.

A FIFO memory area (0509). The FIFO memory area contains all configuration strings that could not be processed successfully in a first attempt.

FIG. 6 shows two sections of a configuration. These sections show the commands and configuration strings processed by the PLU. It also shows two sections from the jump table (0601 and 0607) and the status of these sections (0602 and 0608) after processing of the two configuration sections.

Embodiments: It is assumed that one or more units are to be reconfigured by a PLU as described in the invention. In addition, it is assumed that the system has already loaded the start configuration and that the PLU is in the state of "waiting for an event." The execution begins with the arrival of an event from cell number 41.

The PLU begins first with the processing of The FIFO memory (0201). The start of the FIFO memory is transferred to the PC from the FIFO start REG register. The data at the location to which the PC is pointing is read. Then a check is performed to determine whether the end of the FIFO memory has been reached. This is the case in this embodiment, because the system is being reloaded for the first time.

The address of the cell which has triggered the signal is converted by the PLU to an address in the jump table. This calculated address is loaded into the dispatch REG (0512). The PLU then reads the address out of the jump table (0506) which is stored at the memory address addressed by the dispatch REG (0601). This address is loaded into the PC.

Then the processing of the configuration strings begins (0603). It is assumed that command number 3 (1.3 MUL) cannot be executed because the cell with the address (1.3) cannot be reconfigured. The data is then copied to the FIFO memory. On reaching the DISPATCH command (0604), a new address is entered (0602) at address 41 in the jump table. The END command again puts the PLU in the state of "waiting for an event."

After a period of time, a signal again arrives from cell 41. Now there is another address (0602) at address 42 in the jump table. The PLU again processes the FIFO memory first. Now the data is in the FIFO memory.

The data from the FIFO memory is read and an attempt is made to load the addressed cell with the data. Since the cell can now be reconfigured, this attempt is successful. A blank identifier is then written into the entry in the FIFO memory.

The original processing is continued and the reading of configuration data then begins at a different address (0605).

This configuration is processed; this time the DISPATCH command writes an address into entry number 12 of the jump table (0606). Then the END command causes the PLU to return to the state of "waiting for an event."

This interplay is repeated for the entire run time of the system.

Definition of Terms

Configurable element: A configurable element is a unit of a logic unit which can be set by a configuration string for a specific function. Configurable elements are thus all types of RAM cells, multiplexers, arithmetic logic units, registers and all types of internal and external interconnection description, etc.

Configuring: Setting the function and interconnection of a configurable element.

Configuration memory: The configuration memory contains one or more configuration strings.

Configuration string: A configuration string consists of a bit sequence of any length. This bit sequence represents a valid setting for the element to be configured, so that a functional element results.

PLU: Unit for configuring and reconfiguring programmable units. Embodied by a state machine or a microcontroller adapted specifically to its function.

Macro: A macro is a quantity of cells which together implement a task, function, etc.

Reconfiguring: New configuration of any number of configurable elements of a programmable unit while any remaining number of configurable elements continue their own functions (see configuring).

Feedback: Feedback is an action that can be triggered by a cell. With feedback, various pieces of information can be sent to the unit receiving the feedback.

Cell: See configurable element.

State machine: Logic unit which can assume various states. The transitions between states depend on various input parameters. These are known machines for controlling complex functions.

What is claimed is:

1. A method of run-time reconfiguration of a programmable unit, the programmable unit including a plurality of reconfigurable function cells in a multidimensional arrangement, comprising the steps of:

detecting an event;

determining a source of the event;

determining an address of an entry in a jump table as a function of the source of the event, the entry storing a memory address of a first configuration data, the first configuration data being associated with a selected one of the plurality of reconfigurable function cells;

retrieving the first configuration data from a configuration memory as a function of the memory address;

determining a state of the selected one of the plurality of reconfigurable function cells;

if the state of the selected one of the plurality of reconfigurable function cells is a reconfiguration state, reconfiguring the selected one of the plurality of reconfigurable function cells as a function of the first configuration data;

if the state of the selected one of the plurality of reconfigurable function cells is not the reconfiguration state, storing the first configuration data and a respective identification of the selected one of the plurality of reconfigurable function cells in a FIFO memory; and processing configuration data stored in the FIFO memory in first-in first-out order.

2. The method according to claim 1, wherein the processing step includes the steps of:

reading a first entry in the FIFO memory, the first entry including a first respective configuration data and a first respective identification of one of the plurality of reconfigurable function cells;

determining a state of the one of the plurality of reconfigurable function cells;

if the one of the plurality of reconfigurable function cells is in a reconfiguration state, reconfiguring the one of the plurality of reconfigurable function cells as a function of the first respective configuration data; and if the one of the plurality of reconfigurable function cells in not in a reconfiguration state, processing a next entry in the FIFO memory.

3. The method according to claim 1, further comprising the step of:

storing in the configuration memory at least one configuration data, the at least one configuration data corresponding to a complete configuration of at least one of the plurality of reconfigurable function cells.

4. The method according to claim 1, further comprising the step of:

storing in a configuration start register a pointer to a start configuration for configurating the programmable unit to a valid configuration.

5. The method according to claim 1, further comprising the step of:

storing in the configuration memory at least one configuration data, the at least one configuration data corresponding to a partial configuration of at least one of the plurality of reconfigurable function cells.

6. The method according to claim 1, further comprising the step of:

storing in a start configuration register a pointer to a start configuration;

configuring at least one of the plurality of reconfigurable units as a function of the start configuration.

7. The method according to claim 1, further comprising the step of:

storing in a FIFO start register a pointer to a start address of the FIFO memory.

8. The method according to claim 1, further comprising the step of:

storing in a FIFO end register a pointer to an end address of the FIFO memory.

9. The method according to claim 1, further comprising the step of:

storing in a FIFO free entry register a pointer to a first free entry in the FIFO memory.

10. The method according to claim 1, further comprising the step of:

storing in a program counter register a pointer to a next entry in the configuration memory to be processed.

11. The method according to claim 1, further comprising the step of:

storing in an address register an address of one of the plurality of programmable function cells that triggered the event.

12. The method according to claim 1, wherein the reconfiguring step includes the steps of:

storing in a data register the first configuration data; and transmitting the first configuration data to the selected one of the plurality of reconfigurable function cells.

13. A system for reconfiguring a programmable unit, the programmable unit including a plurality of reconfigurable function cells in a multidimensional arrangement, comprising:

a primary logic unit in communication with at least one of the plurality of reconfiguration function cells, the primary logic unit detecting an event and detecting a state of the at least one of the plurality of reconfiguration function cells;

a first memory storing a first configuration data, the first configuration data being associated with a selected one of the plurality of reconfigurable function cells;

a jump table coupled to the primary logic unit having a plurality of entries, at least one of the plurality of entries storing a memory address of the first configuration data, wherein when the primary logic unit detects the event, the primary logic unit retrieves the memory address and retrieves the stored first configuration data as a function of the memory address; and a FIFO memory coupled to the primary logic unit for storing the first configuration data if the selected one of the plurality of reconfigurable function cells is not in a reconfiguration state.

14. A method of run-time reconfiguration of a programmable unit, the programmable unit including a plurality of reconfigurable function cells in a multidimensional arrangement, comprising the steps of:

a) detecting an event;

b) determining a source of the event;

c) determining an address of an entry in a jump table as a function of the source of the event, the entry storing a memory address of a configuration data, the configuration data being associated with a selected one of the plurality of reconfigurable function cells;

d) retrieving the configuration data from a configuration memory as a function of the memory address;

e) determining a state of the selected one of the plurality of reconfigurable function cells;

f) if the state of the selected one of the plurality of reconfigurable function cells is a reconfiguration state, reconfiguring the selected one of the plurality of reconfigurable function cells as a function of the configuration data;

g) if the state of the selected one of the plurality of reconfigurable function cells is not the reconfiguration state, storing the configuration data and a respective identification of the selected one of the plurality of reconfigurable function cells in a FIFO memory;

h) retrieving a next configuration data from the configuration memory;

i) repeating steps e–h until an end of the configuration data is reached;

j) if the end of the configuration data, performing one of i) processing a next event, and ii) processing the configuration data stored in the FIFO memory in first-in first-out order.

15. The method according to claim 14, wherein the processing step of step j includes the steps of:

reading an entry in the FIFO memory, the entry including a respective configuration data and a respective identification of one of the plurality of reconfigurable function cells;

determining a state of the one of the plurality of reconfigurable function cells;

if the one of the plurality of reconfigurable function cells is in a reconfiguration state, i) reconfiguring the one of the plurality of reconfigurable function cells as a function of the respective configuration data, and ii) removing the entry from the FIFO memory;

if the one of the plurality of reconfigurable function cells in not in a reconfiguration state, processing a next entry in the FIFO memory;

if an end of the FIFO memory is reached, processing the FIFO memory from a beginning of the FIFO memory.

* * * * *